United States Patent
Tanaka et al.

(10) Patent No.: US 7,035,090 B2
(45) Date of Patent: Apr. 25, 2006

(54) INTERLOCKING MECHANISM FOR A DISPLAY

(75) Inventors: Toshiyuki Tanaka, Laguna Niguel, CA (US); Hiroshi Nakamura, Ome (JP); Martin P. Riddiford, London (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 248 days.

(21) Appl. No.: 10/654,787

(22) Filed: Sep. 4, 2003

(65) Prior Publication Data

US 2005/0052833 A1 Mar. 10, 2005

(51) Int. Cl.
*G06F 1/16* (2006.01)

(52) U.S. Cl. ............... 361/681; 361/683; 345/169; 349/58

(58) Field of Classification Search ........... 361/681, 361/682, 683, 726–727, 686; 248/161, 917–923, 248/157, 429, 346.03, 346.04, 258; 345/7, 345/87, 168, 903, 905; 312/223.2, 223.3; 349/58; 362/23, 31, 551, 561, 500, 559, 362/341
See application file for complete search history.

(56) References Cited

U.S. PATENT DOCUMENTS

| | | | |
|---|---|---|---|
| 5,168,423 A * | 12/1992 | Ohgami et al. ............ 361/681 |
| 5,229,921 A * | 7/1993 | Bohmer .................... 361/681 |
| 5,268,817 A | 12/1993 | Miyagawa et al. |
| 5,489,924 A | 2/1996 | Shima et al. |
| 5,548,478 A | 8/1996 | Kumar et al. |
| 5,644,469 A | 7/1997 | Shioya et al. |
| 6,005,767 A | 12/1999 | Ku et al. |
| 6,094,341 A | 7/2000 | Lin |
| 6,125,040 A * | 9/2000 | Nobuchi et al. .......... 361/726 |
| 6,196,850 B1 | 3/2001 | Dietz et al. |
| 6,198,624 B1 | 3/2001 | Margaritis |
| 6,231,371 B1 | 5/2001 | Helot |
| 6,282,082 B1 | 8/2001 | Armitage et al. |
| 6,396,687 B1 | 5/2002 | Sun et al. |
| 6,430,038 B1 | 8/2002 | Helot et al. |
| 6,437,973 B1 | 8/2002 | Helot et al. |
| 6,464,195 B1 | 10/2002 | Hildebrandt |
| 6,477,871 B1 | 11/2002 | Shaw et al. |
| 6,483,445 B1 | 11/2002 | England |
| 6,504,707 B1 | 1/2003 | Agata et al. |
| 6,519,143 B1 | 2/2003 | Goko |
| 6,519,148 B1 | 2/2003 | Nakagawa et al. |
| 6,654,234 B1 | 11/2003 | Landry et al. |
| 6,707,665 B1 | 3/2004 | Hsu et al. |
| 6,717,798 B1 | 4/2004 | Bell et al. |
| 6,774,870 B1 | 8/2004 | Mead, Jr. et al. |

(Continued)

FOREIGN PATENT DOCUMENTS

JP 07-049725 2/1995

(Continued)

*Primary Examiner*—Michael Datskovskiy
(74) *Attorney, Agent, or Firm*—Blakely Sokoloff Taylor & Zafman, LLP

(57) ABSTRACT

One aspect of an embodiment of the invention provides an apparatus for interlocking a display housing to a display support member. The apparatus comprises a lever, a first fastener and a second fastener. The first fastener is pivotally coupled to one end of the lever. The second fastener, however, is coupled to the other end of the lever. The second fastener engages a display support member when the lever is placed in a first state and disengages from the display support member when the lever is placed in a second state. The adjustment of the lever to move from a first state to a second state is in response to an event performed on the first fastener.

26 Claims, 6 Drawing Sheets

U.S. PATENT DOCUMENTS

| | | |
|---|---|---|
| 6,816,365 B1 * | 11/2004 | Hill et al. .................... 361/681 |
| 6,829,140 B1 | 12/2004 | Shimano et al. |
| 6,842,338 B1 | 1/2005 | Iredale |
| 6,856,506 B1 | 2/2005 | Doherty et al. |
| 6,873,521 B1 | 3/2005 | Landry et al. |
| 2003/0112590 A1 * | 6/2003 | Shimano et al. ............ 361/683 |
| 2003/0142474 A1 | 7/2003 | Karidis et al. |
| 2003/0223190 A1 * | 12/2003 | Hashimoto .................. 361/683 |
| 2004/0057197 A1 | 3/2004 | Hill et al. |
| 2005/0052833 A1 | 3/2005 | Tanaka et al. |
| 2005/0052834 A1 | 3/2005 | Tanaka |
| 2005/0105263 A1 | 5/2005 | Tanaka |

FOREIGN PATENT DOCUMENTS

| | | |
|---|---|---|
| JP | 07-078040 | 3/1995 |
| JP | 10-055227 | 2/1998 |
| JP | 2000-228128 | 8/2000 |
| JP | 2002-222026 | 8/2002 |
| JP | 2003-044169 | 2/2003 |

* cited by examiner

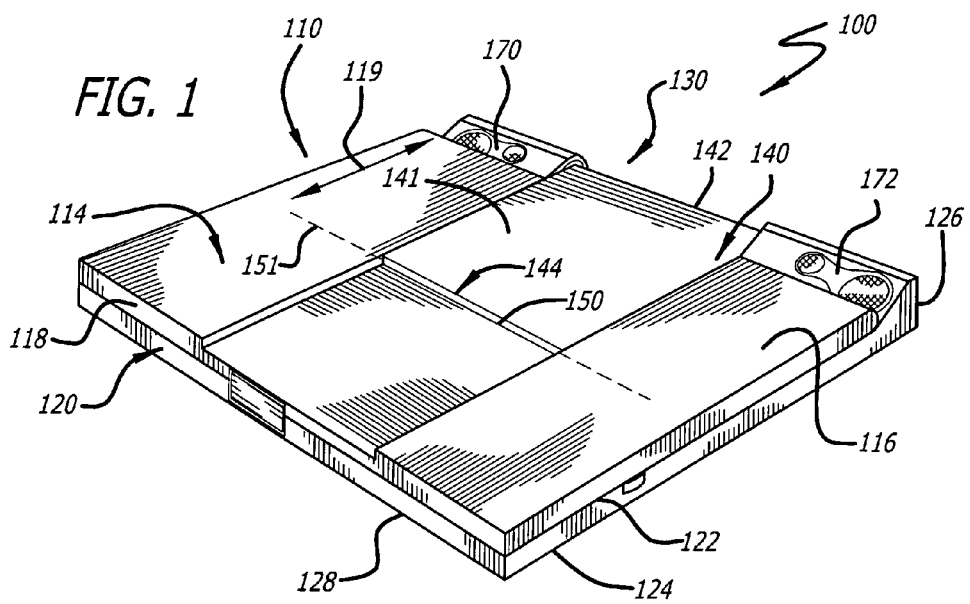
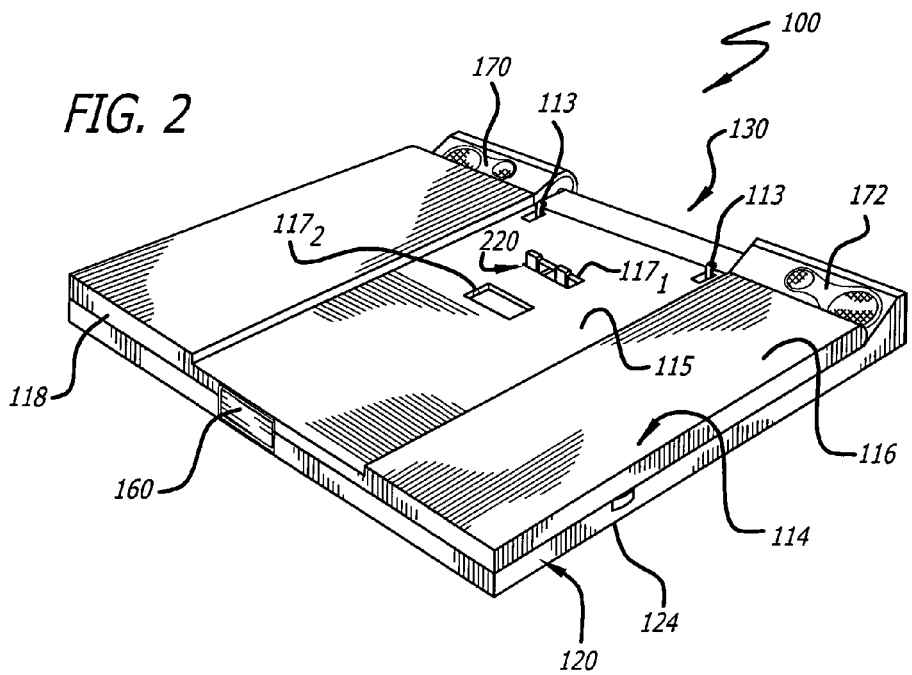

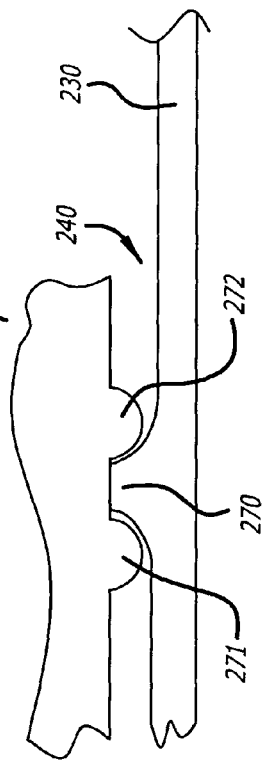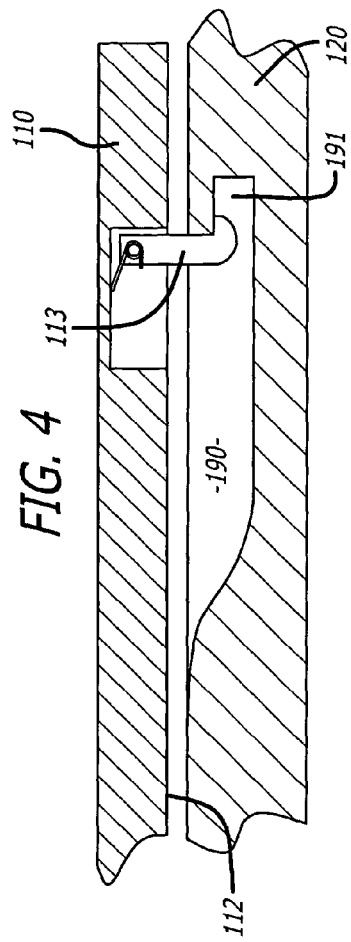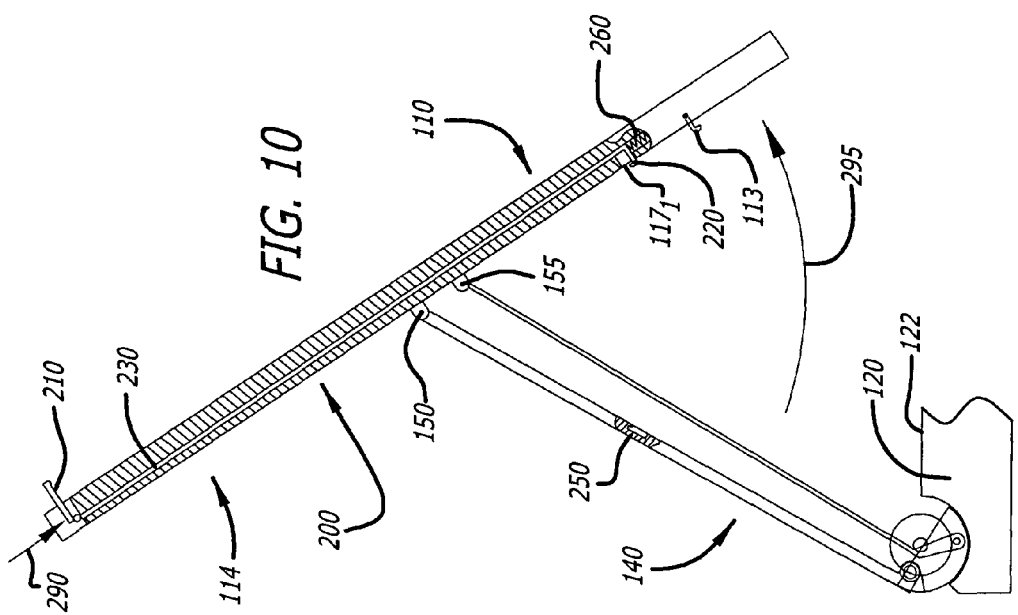

INTERLOCKING MECHANISM FOR A DISPLAY

FIELD

Embodiments of the invention generally relate to the field of flat panel displays. More specifically, embodiments of the invention relate to an interlocking mechanism that enables a bottom portion of a display housing for a flat panel display to be fastened to or unfastened from a display support member of an electronic device.

GENERAL BACKGROUND

Over the past decade, there has been increased demand for laptop computers, especially in light of their enhanced data processing capabilities. Operating from either external or portable power sources, conventional laptop computers feature a display housing pivotally connected to a body case. Typically, the display housing features a liquid crystal display (LCD) while the body case features a keyboard and a secondary input device, such as a roller ball or a touch pad for example.

In order to access the keyboard and view the LCD, a user places the body case on a surface (e.g., the user's lap or a stationary surface) and opens the laptop computer by pivoting the display housing in an upward angular direction away from the body case. As a result, the user is able to access the keyboard and secondary input device as well as to read the displayed content from the LCD. To close and transport the laptop computer after use, the user pivots the display housing toward the body case and secures the display housing. Such pivoting is accomplished by a hinge attached to a rear surface of the body case.

Due to the growing popularity of personal digital assistants and tablet computers, laptop computers are now being configured to alternatively operate as a tablet computer, with a stylus operating as the input device. This requires the display housing to be inverted, namely the LCD is positioned to face upward and to rest against the body case.

U.S. Pat. No. 5,268,817 illustrates one mechanism in which a display housing is inverted using a secondary hinge positioned to protrude from two opposite side edges of the display housing. Such inversion converts the laptop computer into a tablet computer. However, this conventional display housing possesses a number of disadvantages.

For instance, one disadvantage is that this conventional display housing employs two independent locking mechanisms, namely a pair of locking pins to preclude rotation of the LCD and a lock to attach the display housing to the body casing. Thus, multiple areas of the computer need to be accessed by the user, which makes the locking/unlocking procedure cumbersome. Moreover, independent locking mechanisms may increase overall manufacturing costs and increase the potential likelihood of a structural failure.

BRIEF DESCRIPTION OF THE DRAWINGS

Features and advantages of embodiments of the invention will become apparent from the following detailed description in which:

FIG. 1 is a perspective view of an exemplary embodiment of an electronic device placed in a CLOSED position and implemented with an embodiment of the invention.

FIG. 2 is a perspective view of the electronic device of FIG. 1 without the display support member.

FIG. 4 is a cross-sectional view of the electronic device with a retention hook engaged with a recessed area of a top surface of the body case.

FIG. 8 is a side elevation view of the electronic device illustrating a second embodiment of a biasing mechanism utilized by the interlocking mechanism with dual fasteners.

FIG. 10 is a side elevation view of the display housing being rotated about an axis of rotation provided by the hinge units.

DETAILED DESCRIPTION

Figure 3:
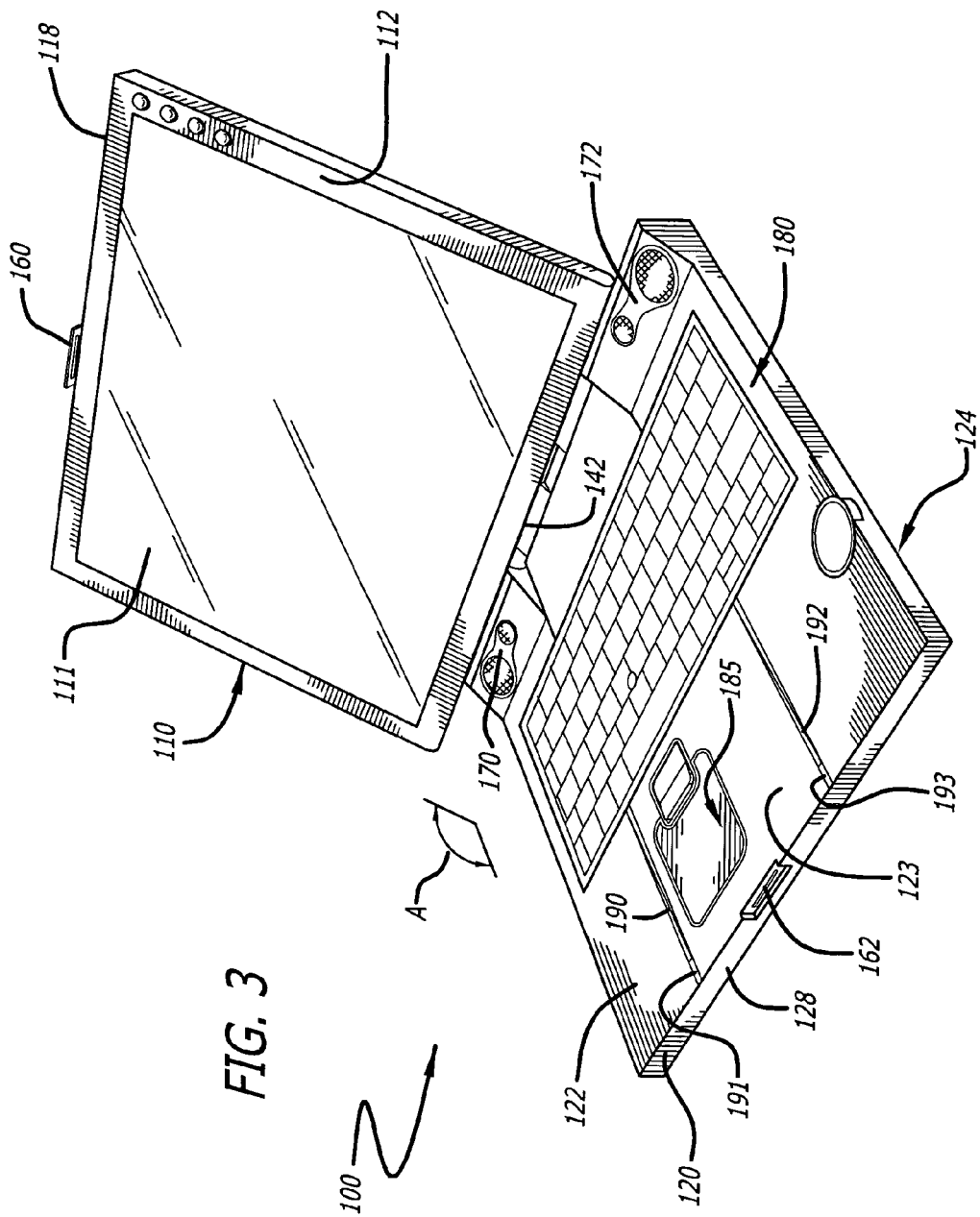
FIG. 3 is a perspective view of the electronic device of FIG. 1 when placed in an OPENED position.

Embodiments of the invention set forth in the following detailed description generally relate to an interlocking mechanism for a flat panel display that provides dual fastening capabilities. Herein, at least one embodiment of the invention relates to an interlocking mechanism that comprises a first fastener and a second fastener. The first fastener is adapted to attach a display housing to a body case of the electronic device. The second fastener enables a bottom portion of the display housing to become attached to or detached from a display support member of an electronic device.

In the following description, certain terminology is used to describe certain features of one or more embodiments of the invention. For instance, an "electronic device" is defined as a consumer electronic product with a flat panel display. In this detailed description, for clarity sake and for illustrative purposes only, the electronic device will be illustrated as a portable computer that can be alternatively converted to a tablet computer. However, it is contended herein that the invention may be utilized in a variety of electronic devices including, but not limited or restricted to personal digital assistants, cellular telephones, digital cameras, video cameras, navigation systems, and the like.

Herein, the terms "rotate," "pivot," as well as varying tenses thereof are generally defined as an angular movement about an axis of rotation. Normally, the axis of rotation is fixed. For this detailed description, the terms "vertically" pivoted (or any tenses thereof) generally relates to a rotation along a substantially horizontal axis of rotation. The term "horizontally" pivoted (or any tense thereof) generally relates to rotation along a substantially vertical axis of rotation.

Referring now to FIG. 1, a perspective view of an illustrative electronic device 100 placed in a CLOSED position is shown. Implemented with an embodiment of an interlocking mechanism as described below, electronic device 100 comprises a display housing 110 that is pivotally coupled to a body case 120 through a hinge assembly 130 and a display support member 140.

For one embodiment of the invention, body case 120 comprises two main panel sections, namely a front panel section 122 and a back panel section 124 (see also FIG. 3). These panel sections 122 and 124 are brought together to enclose hardware components and stored software of electronic device 100. This provides protection against foreign materials and environmental conditions. For this embodiment of the invention, panel sections 122 and 124 are made of non-pliable material such as hardened plastic.

Display housing 110 houses a flat panel display 111 as well as circuitry for generating a displayable image on flat panel display 111. Examples of flat panel display 111 include, but are not limited or restricted to a liquid crystal display (LCD), a plasma display or the like.

Returning still to FIG. 1, for this embodiment of the invention, display housing 110 comprises two panel sections coupled together. These panel sections include a front display panel 112 (see FIG. 3) and a back display panel 114.

As shown in FIGS. 1 and 2, back display panel 114 includes a recessed area 115 that is sized to accommodate display support member 140 so that, when electronic device 100 is in the CLOSED position as shown in FIG. 1, a top surface 116 of back display panel 114 is substantially coplanar with a top surface 141 of display support member 140.

Recessed area 115 of back display panel 114 may include one or more recessed portions $117_1$–$117_N$ (where N>1). Herein, as an illustrative embodiment, a first recessed portion $117_1$ may be an opening to a spacing adapted to maintain the interlocking mechanism as shown in detail in FIG. 6. One of the fasteners from the interlocking mechanism may be configured to protrude from first recessed portion $117_1$. In one embodiment of the invention, a second fastener 220 protrudes from first recessed portion $117_1$ when disengaged, but would be sized so as to not exceed the depth of recessed area 115. As a result, second fastener 220 will not come into direct contact with the top surface of front panel section 122 of body case 120. In another embodiment, second fastener 220 could be configured so as to not protrude from first portion recessed $117_1$ when disengaged from display support member 140.

As shown, second fastener 220 of the interlocking mechanism is illustrated as a fastener having a plurality of prongs separated by a predetermined distance. However, it is contemplated that second fastener 220 may be configured with a single prong as shown below.

Figure 12:
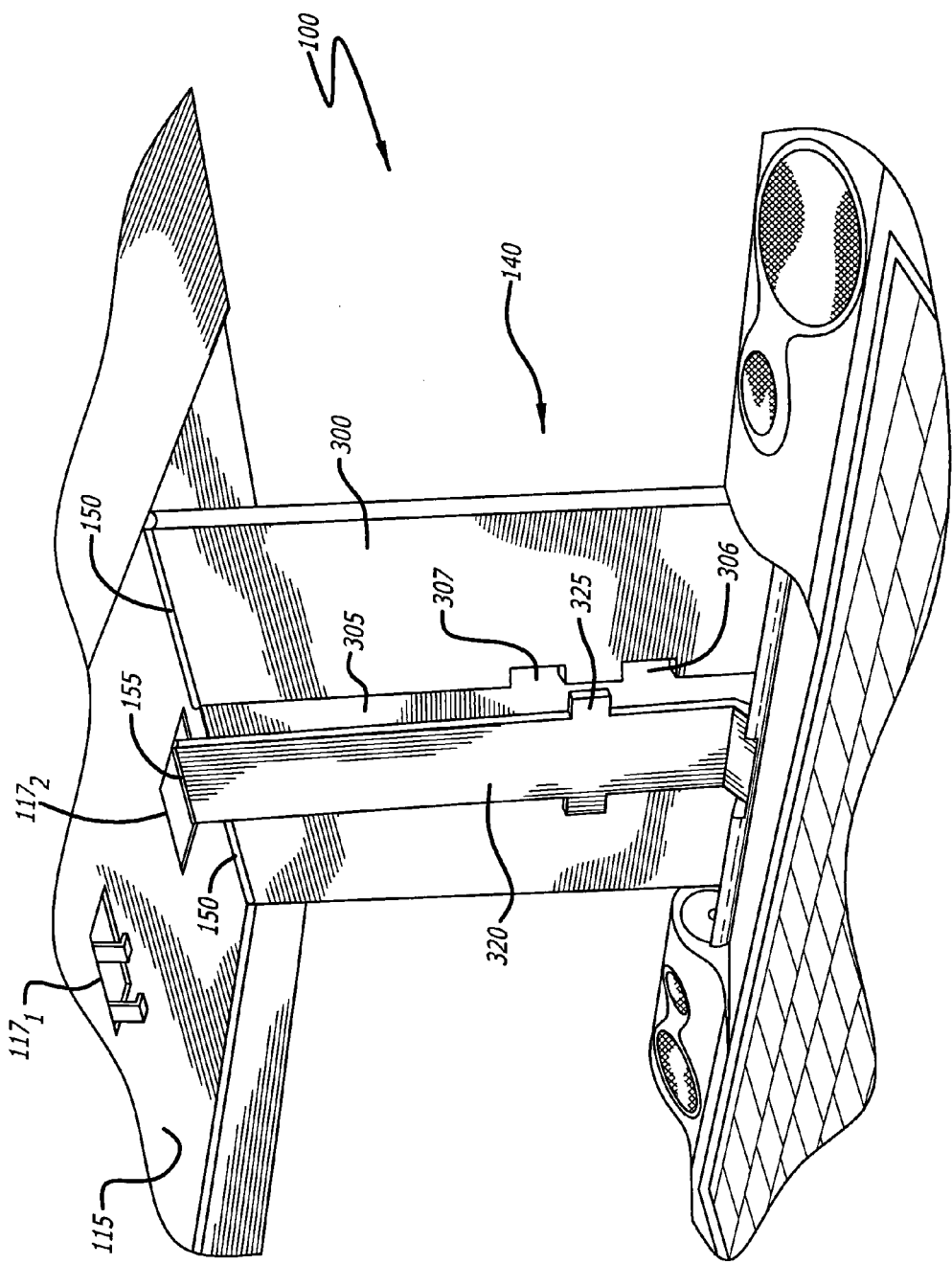
FIG. 12 is a perspective view of an embodiment of the display support member.

Additionally, a second recessed portion $117_2$ may be adapted to maintain a second hinge unit 155 as shown in detail in FIG. 12. Second hinge unit 155 may be a friction hinge; however, it is contemplated that second hinge unit 155 may be a collection of friction hinges or perhaps one or more hinges without a brake mechanism. Also, one or more spring-loaded retention hooks 113 may be positioned within recessed area 115 as shown.

For one embodiment of the invention, hinge assembly 130 is configured for coupling to a bottom edge 126 of body case 120 and a first end 142 of a display support member 140. As one embodiment of the invention, hinge assembly 130 is adapted with a brake mechanism, such as a torsion bar mechanism or a frictional hinge, in order to maintain display housing 110 at a selected angle of rotation above body case 120. For instance, hinge assembly 130 may be adapted to maintain display housing 110 at an angle A, where "A" ranges between approximately 30 degrees to 150 degrees (see FIG. 3).

A first hinge unit 150 is adapted to a second end 144 of display support member 140. As one embodiment of the invention, first hinge unit 150 is generally positioned at a longitudinal center 151 of back display panel 114 of display housing 110. The portion of display housing 110 between longitudinal center 151 established by first hinge unit 150 and hinge assembly 130 is referred to as the "bottom portion" 119 of display housing 110. It is contemplated, however, that first hinge unit 150 may be offset from longitudinal center 151. First hinge unit 150 enables display housing 110 to be vertically pivoted according to the horizontal axis of rotation established by first hinge unit 150. Similarly, second hinge unit 155 provides greater stability in maintain display housing 110 at a viewing angle or in rotating display housing 110.

Referring now to FIG. 3, a perspective view of electronics device 100 when placed in an OPENED position is shown. Electronic device 100 further comprises a keyboard 180 integrated into body case 120. In addition, a secondary input device 185, such as a touch pad or track ball for example, is integrated into body case 120 as well.

A first fastener 160 is positioned along a top edge 118 of display housing 110 for fastening to a complimentary fastener 162, which is positioned on a top edge 128 of body case 120. These fasteners 160 and 162, when engaged, prevent the angular rotation of display housing 110 and maintain electronic device 110 in a CLOSED position until disengaged.

Dual speakers 170 and 172 are integrated into body case 120 and separated by display support member 140. Speakers 170 and 172 are substantially visible when the display housing 110 is placed in a CLOSED position.

For one embodiment of the invention, one or more channels 190 and 192 are formed on front panel section 122. Each channel 190 and/or 192 includes a recessed area 191 and 193 as further shown in FIG. 4. Each recessed area (e.g., recessed area 191) receives a spring-loaded retention hook 113 when display housing 110 is inverted and positioned against body case 120. Spring-loaded retention hooks 113 recoil when bottom portion 119 of display housing 110 is detached from display support member 140. Otherwise, spring-loaded retention hooks 113 are pushed into display housing 110 by display support member 140 when electronic device 100 is in a CLOSED or OPENED position as shown in FIGS. 1 and 3.

It is contemplated that different areas of display housing 110 and body case 120 may be adapted with different materials. For instance, a portion 123 of front panel section 122 surrounding secondary input device 185 may be adapted with stainless steel or another metal composition in lieu of hardened plastic to improve resiliency to damage after prolonged use.

Figure 5:
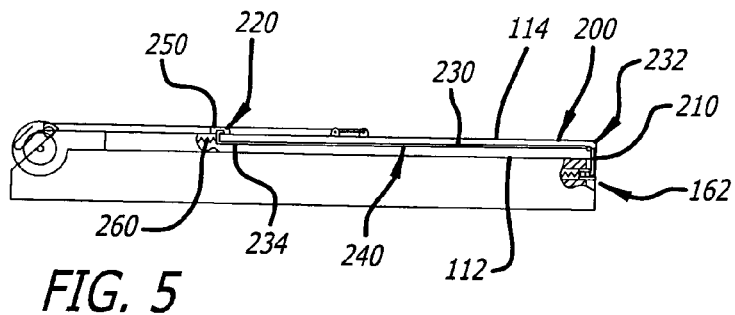
FIG. 5 is a side elevation view of the electronic device of FIG. 1.

Referring now to FIG. 5, a side elevation view of electronic device 100 of FIG. 1 is shown. For this embodiment of the invention, an interlocking mechanism 200 is configured with dual fastening capability. In particular, interlocking mechanism 200 comprises a first fastener 210 and a second fastener 220, which are coupled together by a bar 230. Made of a rigid material such as metal or hardened plastic, bar 230 comprises a first end 232 pivotally coupled to first fastener 210 and a second end 234 fixedly coupled to second fastener 220. As shown herein, bar 230 is utilized as a lever to control the engagement or disengagement of second fastener 220.

Figure 6:
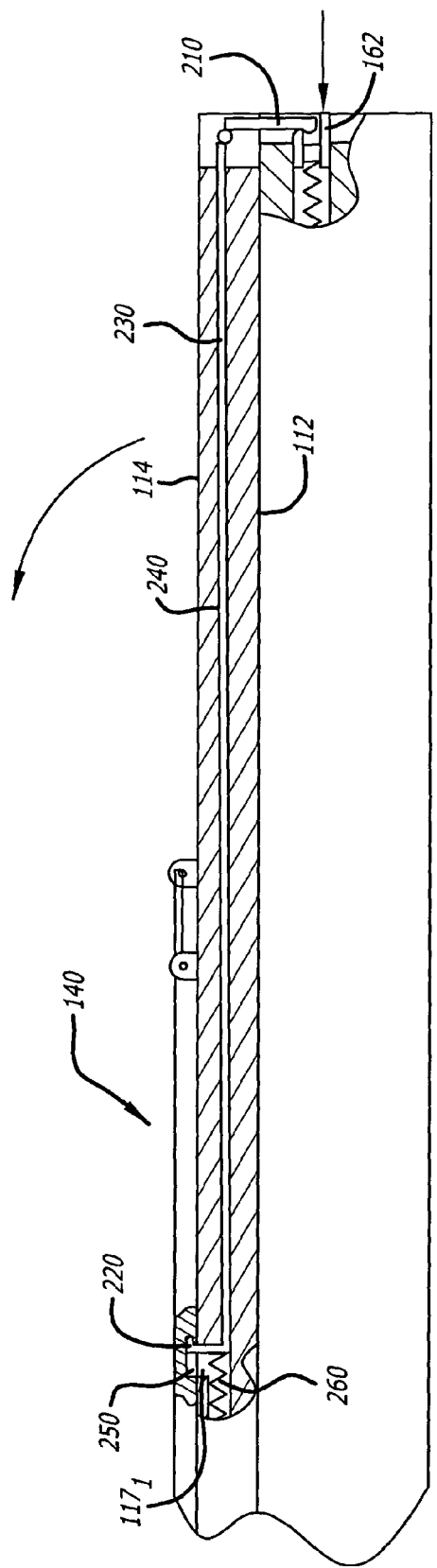
FIG. 6 is a cross-sectional view of the electronic device illustrating a first embodiment of the interlocking mechanism with dual fasteners having a second fastener engaged with the display support member.

As shown in more detail in FIG. 6, a cross-sectional view of electronic device 100 illustrating a first embodiment of interlocking mechanism 200 is shown. Herein, lever 230 is positioned within a spacing 240 formed between front display panel 112 and back display panel 114 of display housing 110. Lever 230 enables second fastener 220 to become engaged with and disengaged from a slot 250 formed within display support member 140. An opening is positioned within the recessed area of back display panel 114 such as recessed portion $117_1$.

A biasing mechanism 260 may be placed in spacing 240 in order to maintain lever 230 in a first state. For instance, biasing mechanism 260 may be a spring positioned to apply a lateral (horizontal) force against lever 230. This retains second fastener 220 to remain engaged in slot 250 of display support member 140 until additional forces are applied as described below.

Upon disengaging first fastener 210 and performing an event on first fastener 210, such as depressing first fastener 210 for example, lever 230 is laterally shifted and placed in a second state. As a result, second fastener 220, which is fixedly coupled to lever 230, is also laterally shifted. Thus, as shown in FIG. 7, second fastener 220 is adapted to clear a flange 252 of slot 250 and become disengaged from slot 250 when display housing 110 as rotated counter-clockwise.

Figure 7:
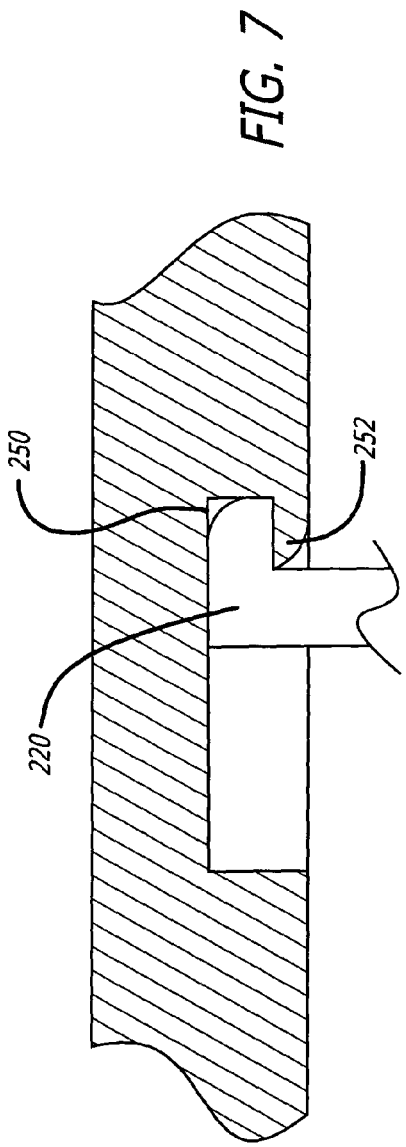
FIG. 7 is a cross-sectional view of a slot deployed within the display support member for retaining the second fastener.

As shown in detail in FIG. 7, flange 252 features a curved shape that not only assists in preventing second fastener 220 from being disengaged from slot 250, but also assists in the engagement of second fastener 220 into slot 250. It is contemplated, however, that second fastener 220 may be engaged to display support member 140 through a variety of mechanisms, including but not limited to slot 250 without flange 252.

Alternatively, in lieu of a spring, biasing mechanism 260 may be accomplished by a set of retention bumps 270–272 placed on lever 230 and spacing 240 as shown in FIG. 8. For instance, according to this embodiment, when lever 230 is placed in the first state, a retention bump 270 may be positioned between retention bumps 271 and 272. This prevents second fastener 220 of the interlocking mechanism from being disengaged from slot 250. However, when lever 230 is placed in a second state where retention bump 270 is removed from the area between retention bumps 271 and 272 (e.g. bump 270 now to the left of bump 271), second fastener 220 may be disengaged from slot 250.

More specifically, when laterally shifted inward, lever 230 is forced slightly downward within spacing 240 to enable retention bump 270 to clear a retention bump 271. The second fastener is fixedly attached to lever 230. As a result, the second fastener laterally shifts within the slot to allow the second fastener to become disengaged when the display housing is rotated in a counter-clockwise direction. Of course, as yet another alternative, it is contemplated that lever 230 may be implemented with two or more retention bumps while spacing 240 is implemented with one or more retention bumps.

It is further contemplated that lever 230 may be positioned merely along a surface of the back display panel, perhaps within the recessed area instead of within spacing 240. This would warrant lever 230 to be configured generally flat in order to minimize the amount of space needed for lever 230.

Referring back to FIG. 5, when electronic device 100 is placed in a CLOSED position, first fastener 210, equivalent to fastener 160 of FIG. 1, is engaged with complementary fastener 162 of body case 120. This prevents angular rotation of display housing 110 and display support member 140. Also, second fastener 220 is engaged with slot 250 of display support member 140.

Figure 9:
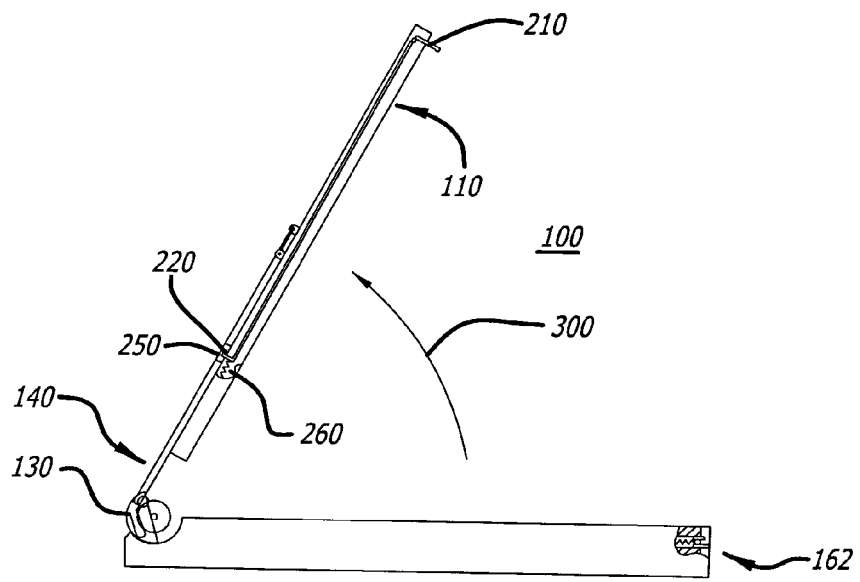
FIG. 9 is a side elevation view of the electronic device placed in a partially OPENED position.

Referring now to FIG. 9, a side elevation view of electronic device 100 placed in a partially OPENED position is shown. Herein, first fastener 210 is disengaged from complementary fastener 162, which allows display housing 110 to be vertically pivoted by hinge assembly 130 as depicted by arrow 300. Second fastener 220 remains engaged with slot 250 so that both display housing 110 and display support member 140 are vertically pivoted simultaneously.

Referring to FIG. 10, a side elevation view of display housing 110 being rotated about an axis of rotation provided by first and second hinge units 150 and 155 is shown. For this embodiment of the invention, second fastener 220 has disengaged from slot 250. This is accomplished in response to an event performed on interlocking mechanism 200 as depicted by arrow 290.

For instance, according to one embodiment of the invention, in response to an event performed on first fastener 210, lever 230 is laterally shifted from a first state to a second state. Examples of these events may include (i) depressing/pulling first fastener 210, (ii) twisting first fastener 210 in a circular motion, (iii) pivoting first fastener 210, or the like. This event causes biasing mechanism 260 to be adjusted and allows second fastener 220 to become disengaged from slot 250 upon rotation of display housing 110 is depicted by arrow 295.

As shown, when biasing mechanism 260 is implemented as a spring, lateral movement of lever 230 causes compression of spring 260. This allows second fastener 220 to become disengaged from slot 250. When biasing mechanism 260 is implemented as retention bumps, however, lateral movement of lever 230 causes different retention bumps to maintain the lateral position of lever 230, but this again allows second fastener 220 to become disengaged from slot 250.

After second fastener 220 becomes disengaged from slot 250, display housing 110 can be freely rotated on an axis of rotation provided by first and second hinge units 150 and 155. As one embodiment, the maximum degree of rotation provided by hinge units 150 and 155 is approximately 180 degrees. First hinge unit 150 may be implemented with a brake mechanism. This would enable display housing 110 to be maintained at certain degrees of rotation.

Figure 11:
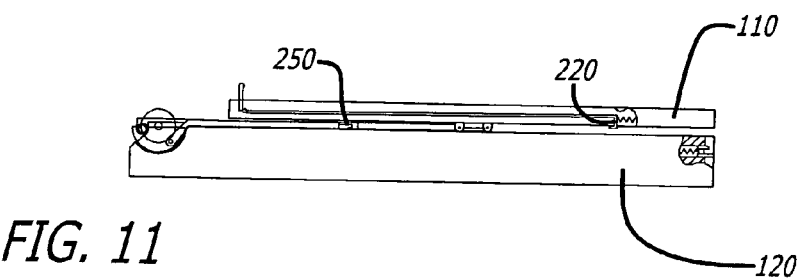
FIG. 11 is a side elevation view of the electronic device in which the display housing has been fully inverted.

As further shown in FIG. 10, display housing 110 is rotated in a counter-clockwise direction as represented by arrow 295 in order to invert display housing 110. As a result, back display panel 114 of display housing 110 is adapted to be flush against top panel section 122 of body case 120 and display support member 140 as shown in FIG. 11. Front display panel 112 would be viewable by the user. Moreover, during rotation of display housing 110, display support member 140 forms a dual member assembly to enhance support of the flat panel display.

Referring now to FIG. 12, a perspective view of an embodiment of display support member 140 is shown. Display support member 140 comprises a first member 300 and a second member 320. In general, first member 300 is pivotally coupled to both hinge assembly 130 and first hinge unit 150. Second member 320 is pivotally coupled to hinge assembly 130 and second hinge unit 155. Both hinge units 150 and 155 are positioned in recessed area 115 of back display panel 114.

First member 300 includes a recessed area 305 sized to accommodate second member 320 during all positions except when display housing 110 is being rotated about an axis of rotation provided by hinge units 150 and 155. More specifically, as one embodiment of the invention, recessed area 305 includes a plurality of recessed portions such as recessed portions 306 and 307 for example. A first recessed portion 306 is configured to receive protrusions 325 of second member 320 when electronic device 100 is placed in a CLOSED position. In this position, second member 320 is substantially coplanar to first member 300.

As further shown in FIG. 12, a second recessed portion 307 operates as slot 250 for second fastener 220, which is illustrated as a fastener having dual prongs separated by a width slightly exceeding the width of second member 320. Where second fastener 220 is a single prong fastener, only a part of second recessed portion 307 is needed as slot 250. However, when display housing 110 is completely inverted, second recessed portion 307 receives protrusions 325 of second member 320.

Referring back to FIGS. 9 and 10, initial counter-clockwise rotation of display housing 110 along an axis of rotation established by first hinge unit 150 causes second member 320, substantially coplanar to recessed area 305 and first member 300, to move away from first member 300. Continued counter-clockwise rotation further separates second member 320 from first member 300 so that first member 300 and second member 320 are substantially in parallel and separated by a predetermined distance. In one embodiment, the predetermined distance exceeds one-quarter of an inch; however, any predetermined distance can be accommodated.

Further counter-clockwise rotation of display housing 110 along an axis of rotation established by first hinge unit 150, generally exceeding 90 degrees from its non-rotated state in the OPENED position, causes reduced separation of first member 300 and second member 320. When display housing 110 is fully inverted, second member 320 is again positioned in recessed area 305 of first member 300 and generally as coplanar to first member 300.

Referring back again to FIG. 11, a side elevation view of electronic device 100 in which display housing 110 has been fully inverted is shown. Herein, display support member 140 is now interposed between display housing 110 and body case 120. Second fastener 220 of interlocking mechanism 200 is configured so as to not protrude above a depth of recessed area 115. This prevents second fastener 220 from causing scratching and other physical damage to body case 120 when electronic device 100 is placed in an INVERTED position.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible.

What is claimed is:

1. An apparatus comprising:
   a body
   a display housing;
   a display support member including one end coupled to the body and another end coupled to the display housing; and
   an interlocking mechanism selectively coupling the display housing to the body and selectively coupling the display housing to the display support member, the interlocking mechanism including
      a lever,
      a first fastener coupled to the lever and configured to selectively engage with the body, and
      a second fastener coupled to the lever and configured to engage with the display support member when the lever is placed in a first state and to disengage from the display support member when the lever is placed in a second state.

2. The apparatus according to claim 1 wherein the first fastener is pivotally coupled to the lever.

3. The apparatus according to claim 1, wherein the display housing including a pair of panels and the lever is positioned between the pair of panels.

4. The apparatus according to claim 1, wherein the apparatus is a portable computer adapted to be converted to a tablet computer.

5. The apparatus according to claim 1, wherein the lever has a first end and a second end, the first fastener is pivotally coupled to the first end of the lever and the second fastener is fixedly coupled to the second end of the lever.

6. The apparatus according to claim 1 further comprising:
   a biasing mechanism maintaining the lever in the first state unless a user places the lever into the second state.

7. The apparatus according to claim 1, further comprising:
   a position maintaining mechanism including a plurality of retention bumps positioned on the lever and on the display housing, the retention bumps engaging with each other and maintaining the lever in the first state unless a user places the lever into the second state.

8. The apparatus according to claim 1, wherein the second fastener disengages from the display support member in response to a lateral shift of the lever caused by adjusting a position of the first fastener to displace the lever from the first state to the second state.

9. The apparatus according to claim 8, wherein the position adjustment of the first fastener is caused by depressing the first fastener.

10. An interlocking mechanism adapted to a display housing, comprising:
    a bar positioned within the display housing, the bar comprising a first end and a second end;
    a first fastener coupled to the first end of the bar; and
    a second fastener coupled to the second end of the bar, the second fastener to become disengaged in response to an adjustment of the bar.

11. The interlocking mechanism according to claim 10, wherein the second fastener being engaged with or disengaged from a display support member.

12. The interlocking mechanism according to claim 10, wherein the second fastener, when disengaged, enables the display housing to be vertically pivoted independently from the display support member.

13. The interlocking mechanism according to claim 10, wherein the first fastener is pivotally coupled to the first end of the bar and positioned outside to the display housing.

14. The interlocking mechanism according to claim 13, wherein the second fastener is positioned to protrude from an opening in one of a plurality of display panels forming the display housing.

15. The interlocking mechanism according to claim 11 further comprising a biasing mechanism to cause the second fastener to remain engaged with a slot of the display support member until an event causes the adjustment of the bar and disengagement of the second fastener from the slot of the display support member when the display housing is vertically pivoted in a counter-clockwise direction.

16. The interlocking mechanism according to claim 11, wherein the display support member comprising a plurality of members each pivotally coupled to a hinge unit positioned at a back display panel of the display housing.

17. An electronic device comprising:
a body;
a hinge assembly mounted on the body;
a display support member pivotally coupled to the hinge assembly;
a display housing pivotally coupled to (i) the display support member at a first horizontal axis of rotation and pivotally coupled to (ii) the hinge assembly at a second horizontal axis of rotation, the display housing housing a flat panel display; and
an interlocking mechanism comprising a layer, a first fastener coupled to the lever and configured to selectively engage with the body, and a second fastener connected to the first fastener by the lever and configured to selectively engage with the display support member and to disengage from the display support member in response to an event performed on the first fastener.

18. The electronic device according to claim 17, wherein the first fastener of the interlocking mechanism is positioned at a top portion of the display housing and the second fastener of the interlocking mechanism is positioned at a bottom portion of the display housing.

19. The electronic device according to claim 17, wherein the display housing includes a front panel at which the flat panel display is exposed, and a back panel located at an opposite side of the front panel, and
the display support member is pivotally coupled to the display housing approximately at a longitudinal center of the back panel of the display housing.

20. The electronic device according to claim 17, wherein the first fastener of the interlocking mechanism is pivotally coupled to the lever and the second fastener of the interlocking mechanism is fixedly coupled to the lever.

21. The electronic device according to claim 17, wherein the display support member has a slot, with which the second fastener of the interlocking mechanism engages, and the second fastener of the interlocking mechanism is disengaged from the display support member when the second fastener is disengaged from the slot of the display support member.

22. The electronic device according to claim 17, wherein depressing the first fastener of the interlocking mechanism causes the lever and the second fastener to shift laterally, and the second fastener is disengaged from the display support member to allow the display housing to rotate vertically around the first horizontal axis from the display support member.

23. The electronic device according to claim 20, wherein pivoting of the first fastener of the interlocking mechanism causes the lever and second fastener to shift laterally, and the second fastener is disengaged from the display support member to allow the display housing to rotate vertically around the first horizontal axis from the display support member.

24. A method for adjusting a position of a display housing of an electronic device, comprising:
disengaging a first fastener to enable a display housing and a display support member of an electronic device to be collectively rotated about a first horizontal axis of rotation; and
disengaging a second fastener to detach a bottom portion of the display housing from the display support member, the second fastener, connected to the first fastener by a lever, being disengaged in response to an event performed on the first fastener.

25. The method according to claim 24 further comprising:
rotating the display housing independently from the display support member about a second horizontal axis of rotation in order to invert the display housing.

26. The method according to claim 25, wherein the second horizontal axis of rotation is set at an approximate longitudinal center of a back display panel of the display housing.

* * * * *